US007602996B2

(12) United States Patent
Maddison (10) Patent No.: US 7,602,996 B2
(45) Date of Patent: Oct. 13, 2009

(54) MICROSCOPE SYSTEM AND METHOD

(75) Inventor: John R. Maddison, Nottingham (GB)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 822 days.

(21) Appl. No.: 10/772,591

(22) Filed: Feb. 4, 2004

(65) Prior Publication Data

US 2004/0184678 A1 Sep. 23, 2004

(30) Foreign Application Priority Data

Feb. 5, 2003 (GB) ................................. 0302664.8

(51) Int. Cl.
*G06K 9/46* (2006.01)
*G06K 9/00* (2006.01)
*B05D 3/00* (2006.01)
*G01N 1/28* (2006.01)

(52) U.S. Cl. ....................... 382/291; 382/128; 382/278; 382/144; 427/2.11

(58) Field of Classification Search ......... 382/291–299, 382/128, 133, 134, 108, 109, 129, 141, 144–150; 427/2.11
See application file for complete search history.

(56) References Cited

U.S. PATENT DOCUMENTS

| 4,513,438 | A | * | 4/1985 | Graham et al. ............... 382/134 |
| 4,673,988 | A | | 6/1987 | Jansson et al. |
| 4,742,558 | A | | 5/1988 | Ishibashi et al. |
| 4,757,550 | A | * | 7/1988 | Uga ........................... 382/148 |
| 4,777,525 | A | | 10/1988 | Preston, Jr. |
| 5,216,596 | A | | 6/1993 | Weinstein |
| 5,263,136 | A | | 11/1993 | DeAguiar et al. |
| 5,276,550 | A | | 1/1994 | Kojima |
| 5,297,034 | A | | 3/1994 | Weinstein |
| 5,432,871 | A | | 7/1995 | Novik |

(Continued)

FOREIGN PATENT DOCUMENTS

CH 690 384 8/2000

(Continued)

OTHER PUBLICATIONS

Brown, L.G., "A Survey of Image Registration Techniques," ACM Computing Surveys, New York, NY, vol. 24, No. 4, Dec. 1, 1992, pp. 325-376.

(Continued)

*Primary Examiner*—Daniel G Mariam
*Assistant Examiner*—Manav Seth
(74) *Attorney, Agent, or Firm*—Drinker Biddle & Reath LLP (57) ABSTRACT

A microscope system and method is described for determining a position of an area of an object within the complete object, wherein the image of the area of the object is contained within a field of view of a microscope. Image data representing a low magnification image of the complete object is available for use in the method, and may be acquired using a low magnification image data source such as a scanner. In a preferred embodiment, the method is implemented in the form of a computer program running on a workstation, which displays, on a display screen the field of view image, and the image of the complete object, in which the position of the area of the object in field of view is highlighted.

12 Claims, 5 Drawing Sheets

U.S. PATENT DOCUMENTS

| | | | |
|---|---|---|---|
| 5,550,937 | A | 8/1996 | Bell et al. |
| 5,604,344 | A | 2/1997 | Finarov |
| 5,825,532 | A | 10/1998 | Mochizuki et al. |
| 5,939,278 | A | 8/1999 | Boon et al. |
| 6,049,421 | A | 4/2000 | Raz et al. |
| 6,272,235 | B1 | 8/2001 | Bacus et al. |
| 6,452,625 | B1 | 9/2002 | Kapitza |
| 6,674,881 | B2 * | 1/2004 | Bacus et al. ............... 382/128 |
| 6,687,419 | B1 * | 2/2004 | Atkin ....................... 382/284 |
| 6,711,283 | B1 | 3/2004 | Soenksen |
| 6,716,588 | B2 * | 4/2004 | Sammak et al. ............ 435/7.2 |
| 6,847,729 | B1 | 1/2005 | Clinch et al. |
| 2002/0061127 | A1 * | 5/2002 | Bacus et al. ............... 382/128 |
| 2002/0085744 | A1 | 7/2002 | Domanik et al. |
| 2008/0055405 | A1 * | 3/2008 | Maddison .................. 348/79 |

FOREIGN PATENT DOCUMENTS

| | | |
|---|---|---|
| DE | 42 26 523 | 2/1994 |
| DE | 196 33 997 | 3/1998 |
| DE | 198 12 599 | 9/1999 |
| EP | 0 175 549 | 3/1986 |
| EP | 0 380 904 | 8/1990 |
| EP | 0 994 433 | 4/2000 |
| JP | 2002296010 | 10/2002 |
| WO | 97/25678 | 7/1997 |
| WO | 98/39728 | 9/1998 |
| WO | 98/44446 | 10/1998 |
| WO | 99/13360 | 3/1999 |
| WO | WO 00/36440 | 6/2000 |

OTHER PUBLICATIONS

Matthias Nagomi of Helmstedt, "Implementation of X Window applications for image acquisition and control at the Heidelberg wave field microscope." Faculty of Physics and Astronomy Ruprecht-Karls University Heidelberg, Dissertation in the University Course of Physics, Sep. 23, 1996, pp. 1-104 (with English-language translation).

J. Bradl et al., "Microscope Control, Image Acquisition and Visualization in a Network Environment: Towards "Online" Telemicroscopy", Institute of Applied Physics, University of Heidelberg, vol. 4 No. 2 (1997), pp. 241-242 Cell Vision.

Bernhard Schneider et al., "High Precision Localization of Fluorescent Targets in the Nanometer Range by Spatially Modulated Excitation Fluorescence Microscopy", Institute of Applied Physics, University of Heidelberg, Fluorescence Microscopy and Fluorescent Probes, vol. 2, 1998, pp. 63-68.

B. Schneider et al., "A Dual-Laser, Spatially Modulated Illumination Fluorescence Microscope", Institute of Applied Physics, University of Heidelberg, Microscopy and Analysis, Jan. 1999, pp. 5-7.

Renato Ferreira et al., "The Virtual Microscope", American Medical Informatics Association, Oct. 1997, 5 pages.

Dr. Joachim Bradl et al., "Mikroskopsteuerung, Bildaufnahme "online" Telemikroskopi", pp. 1-12 (with English-language translation) Nov. 1996.

Ivar Nordrum, "Real-time Diagnoses in telepathology", $4^{th}$ European Congress on Telepathology, Norway, Adv Clin Path, 1998, pp. 127-178.

PACS, "Basic Principles and Applications", Chapters 7, 8 and 12; ISBN: 0-471-25393-6; 1999.

* cited by examiner

Low Magnification image from Slide Scanner

MICROSCOPE SYSTEM AND METHOD

PRIORITY CLAIM

The present application claims priority to UK Patent Application No. 03 026 64.8, entitled "Microscope System and Method", which application was filed on Feb. 5, 2003.

BACKGROUND OF THE INVENTION

1. Field of the Invention

The present invention relates to the field of microscopy, and in particular to an aid for a microscope user.

2. Description of the Related Art

Microscopes are commonly used to view images of very small objects. A typical optical microscope has several objective lenses, of different magnifying power, to enable an object on a microscope slide to be viewed at different magnifications.

A problem with viewing an object through a microscope is that only a portion of the object can be seen in the field of view at any one time. The higher the magnifying power of the objective lens, the smaller the area of the object visible in the field of view. Thus, at very high magnifications (e.g. use of a 20× (or above) objective lens), the field of view only contains a very small part of the complete object. Consequently, characteristic features of the object, such as its outline shape, or the distinctive shape of features within the object, are unlikely to be visible in the field of view, or, if visible are unlikely to be of a size sufficient to enable determination of the position of the visible area within the overall object.

When using a microscope for studying a biological specimen, for example, a user will typically look at the specimen on the microscope slide with the naked eye (e.g. by holding the slide up to the light) to get a sense of the outline shape of the specimen and the location of distinctive visible features within the outline. The user may then view the object through the microscope at low magnification to more clearly identify the main distinctive features of the object before viewing the object in detail at high magnification.

When viewing the specimen at high magnification, the user estimates the position of the portion of the specimen in the field of view within the overall specimen based on his or her memory of the shape of the specimen. As a result, even the most experienced microscope users find it difficult to determine the exact position of a part of the specimen contained within a field of view in relation to the overall specimen, especially at high magnifications.

Recently, developments have been made in the field of "virtual microscopy" in which digital images of an object are captured from a microscope by a digital camera and assembled together by image processing software to form an overall image of the object which can be displayed on a display screen. An example of a virtual microscopy technique is described in EP-A-0 994 433 in the name of Fairfield Imaging Limited. In the described technique, adjacent images are captured from a microscope at high magnification/resolution and are assembled together to provide a composite image. A low magnification/resolution copy of the image is obtained by image processing which is displayed on a display screen and used as a "navigation map". A user can select, from the navigation map, a portion of the low magnification/resolution image for viewing at high resolution. Thus, the user of a virtual microscope has the benefit of knowing the positional relationship of a displayed high magnification image relative to the overall object.

Although virtual microscopy is increasingly used, it necessitates the provision of an expensive, high precision microscope that is dedicated to imaging microscope slides, along with associated equipment including a stage driver, high quality digital or video camera and associated workstation. Such additional equipment can be bulky, and can inhibit normal use of the microscope when not performing imaging for virtual microscopy.

It would be desirable to provide a system and method which can be used with a conventional microscope that provides some of the aforementioned advantages of virtual microscopy. In particular, it would be desirable to provide a method and apparatus that gives an indication of the position of an area of a microscope specimen, contained within the field of view of a microscope, within the complete specimen.

One method for determining the position of an area of a microscope specimen contained within the field of view of a microscope within the complete specimen is to use an expensive robotic microscope stage which has a stage driver and sensors in order to determine the position of the field of view using the stage coordinates. However this technique is complex and requires expensive equipment not readily available to an average microscope user.

The present invention therefore further aims to obviate the need for such expensive equipment when determining the positional information.

SUMMARY OF THE INVENTION

According to a first aspect, the present invention provides a method for determining a position of an area of an object within said object, wherein an image of said area of said object is contained within a field of view of a microscope, and wherein image data representing a low magnification image of the complete object is available, the method comprising acquiring high magnification digital image data representing an image of the field of view of a microscope; processing the high magnification digital image data to reduce the resolution thereof; comparing the processed high magnification digital image data with portions of the low magnification image data, and, determining said position to correspond to the position of a closest matched portion of the low magnification image data.

The determined position can thus be provided to the user, for example by displaying an image of the complete specimen, using the low magnification image data, on a display screen and highlighting the area of the image corresponding to the field of view.

Advantageously, the method can be carried out without special equipment. For instance, the low magnification image data may be acquired using a conventional scanner; the high magnification image data may be acquired using a digital camera in conjunction with a conventional microscope, and the processing of the image data may be performed by a conventional computer or similar processing device.

According to a second aspect, the present invention provides a computer readable medium including a computer program comprising: a program step for receiving high magnification image data representing the image of a part of an object contained in the field of view of a microscope; a program step for processing the high magnification image data to reduce the resolution thereof; a program step for comparing the processed high magnification image data with portions of low magnification image data for the complete object stored in a data store, and, a program step for determining the position based on the results of the comparison.

Other preferred features and advantages of the present invention will be apparent from the following description and accompanying claims.

BRIEF DESCRIPTION OF THE DRAWINGS

Embodiments of the present invention will now be described, by way of example, with reference to the accompanying drawings, in which.

DETAILED DESCRIPTION

Figure 1:
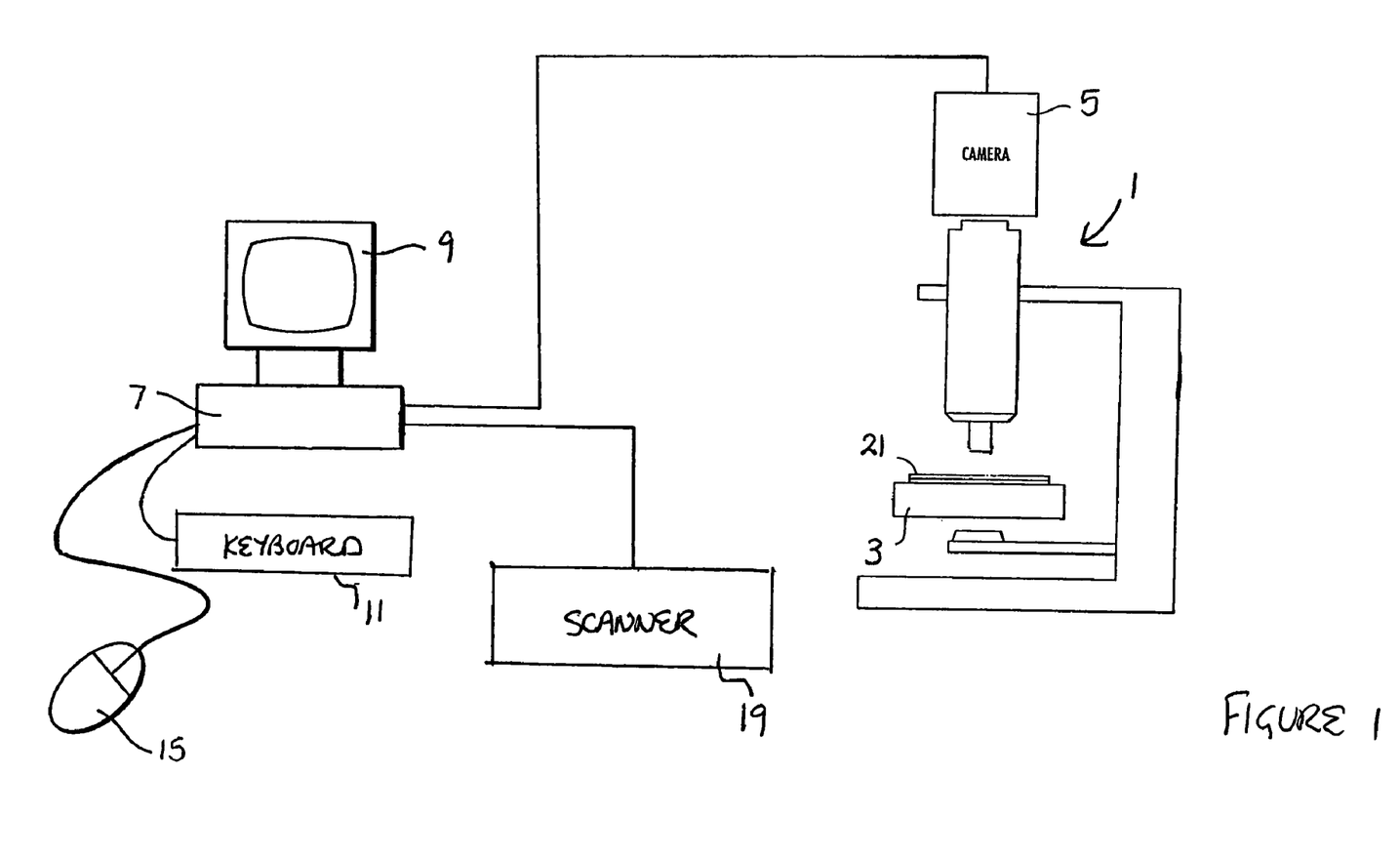
FIG. 1 illustrates an apparatus in accordance with an embodiment of the present invention.

FIG. 1 shows an example of the apparatus used to implement the present invention. Except where otherwise stated, the apparatus takes conventional form and is typically apparatus that is readily available to a microscope user.

The apparatus comprises a microscope 1 including a movable stage 3, and a digital camera 5 connected to a camera attachment of the microscope 1 for capturing images of the microscope field of view. It should be noted that, as well as the camera attachment, the microscope 1 has a separate eyepiece or eyepieces (not shown) to enable a user to use the microscope 1 whilst the camera 5 is attached thereto.

The digital camera 5 is also coupled to provide digital microscope images to a workstation 7, which may be any conventional computer having a processor and memory, that is capable of receiving and storing the digital image data from the camera 5. The workstation 7 has user interfaces including a display screen 9, a keyboard 11 and a mouse 15, and peripheral devices including a printer 17 (not shown) and a flatbed scanner 19.

The workstation 7 is loaded with a computer program in accordance with a preferred embodiment of the present invention. In particular, the computer program implements a method that determines positional information relating to an object under the microscope, namely, the position of an area of an object, the image of which is contained within a field of view of the microscope 1, relative to the complete object. In addition, the computer program provides the determined positional information on the display screen 9, as described in further detail below.

Figure 2:
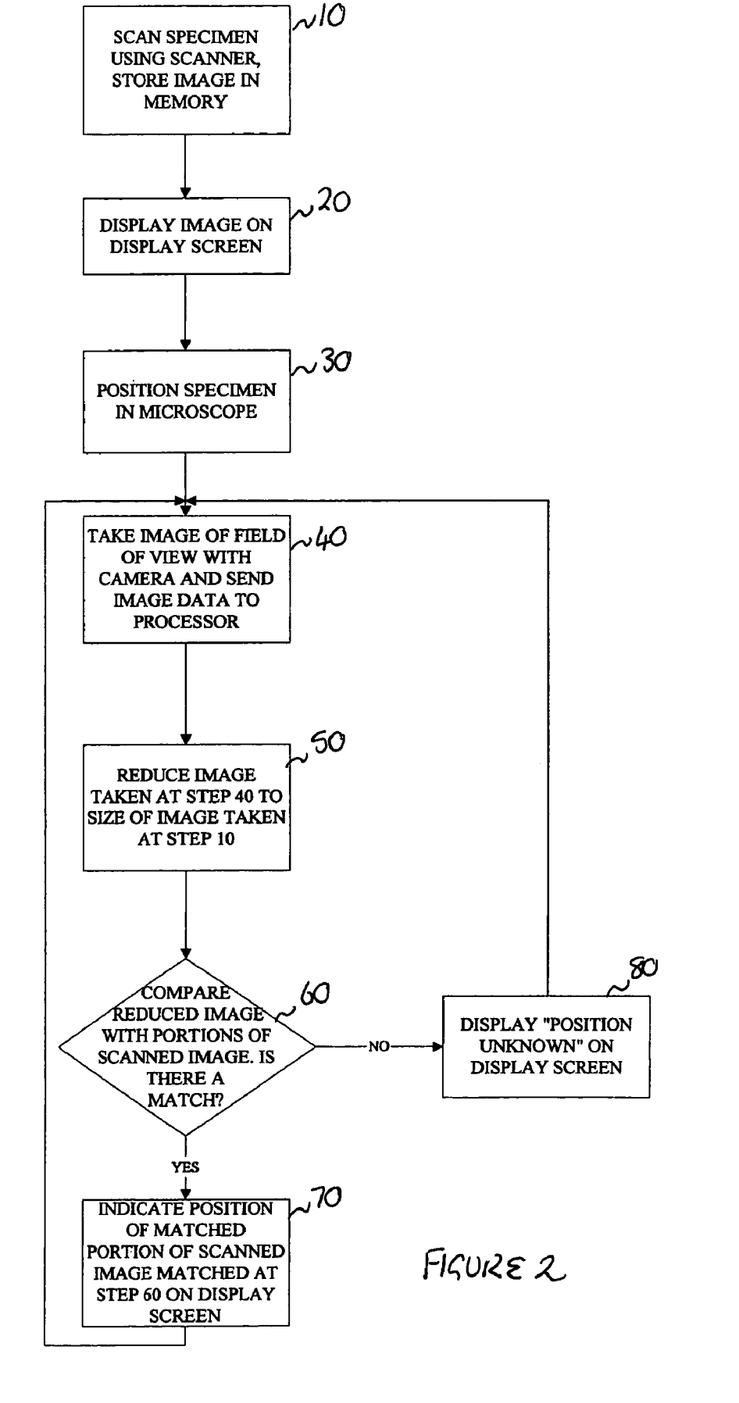
FIG. 2 is a flow diagram illustrating the method of a preferred embodiment of the present invention.

FIG. 2 is a flow diagram of a preferred method for determining a position of an area of a specimen on a microscope slide 21 (as shown in FIG. 1), the image of which is contained within a field of view of the microscope 1 (as shown in FIG. 1), relative to the complete specimen, in accordance with the present invention.

Figure 4:
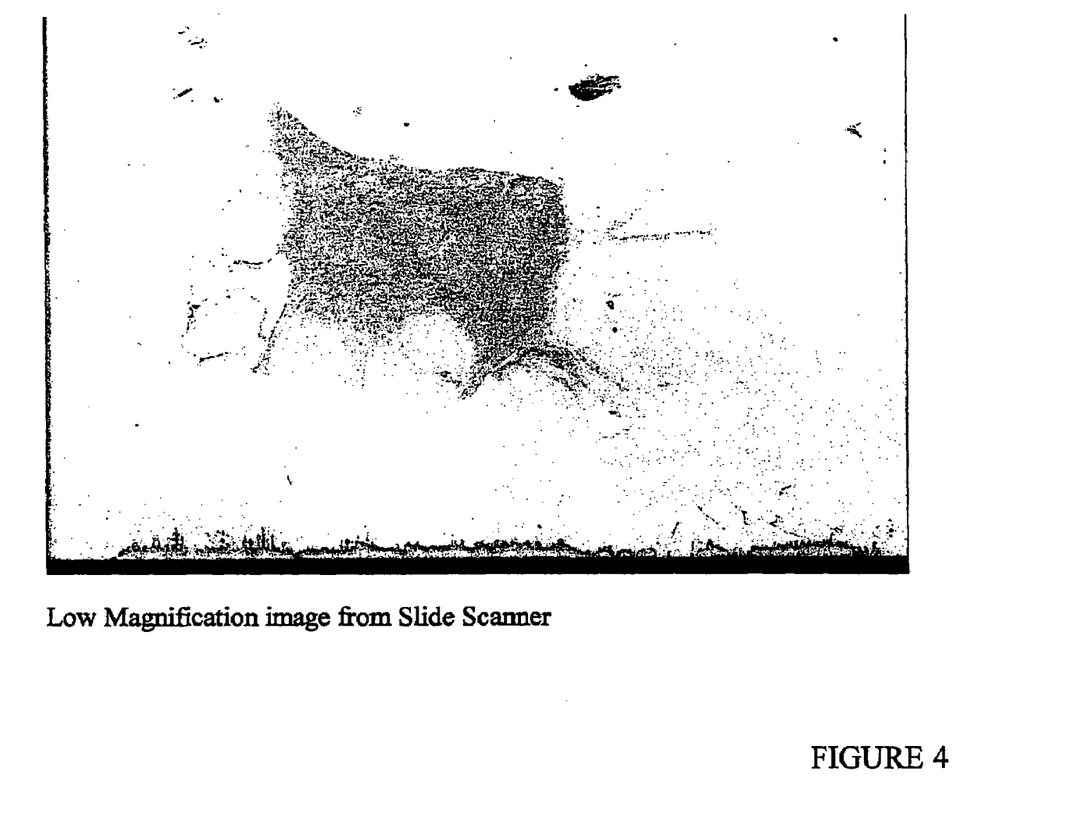
FIG. 4 shows a low magnification image of a specimen for use in the method of the present invention.

At step 10, low magnification image data of the complete specimen is acquired and stored in memory in workstation 7. FIG. 4 depicts, by way of example, low magnification image data, for a biological specimen on the slide 21, acquired by step 10.

Typically step 10 is performed by scanning the microscope slide 21, containing the specimen, without magnification or enlargement of the image, using the flatbed scanner 19 to achieve the highest possible image resolution for the scanner (e.g. 600, 1200 or 2400 dpi). Since there is no magnification, the quantity of image data is kept to a manageable size (e.g. 4000 pixels square for a specimen of 20 mm×20 mm) for processing. It will be appreciated, however, that any appropriate manner of acquiring high resolution digital image data without significant magnification may be used, for example, scanning using a digital photocopier or taking a single image of the complete specimen using a high quality digital camera that can provide similar resolutions to a scanner, as specified above. It will be further appreciated that low level magnification (e.g. use of 2× objective lens) may be desirable in some circumstances and may be used if the quantity of data is manageable (i.e. it can be processed in a reasonable length of time).

At step 20, the display screen 9 displays an image 23 of the complete specimen (or a significant proportion thereof) on the slide 21 represented in the image data acquired at step 10. This image, labelled 23 in FIG. 5, provides the user with a quick reference to the outline shape and characteristic features of the specimen.

At step 30, the user places the slide 21 of the specimen, as shown on the display screen 9, under the microscope 1, and positions the stage 3 at an arbitrary starting point for viewing the specimen.

Figure 5:
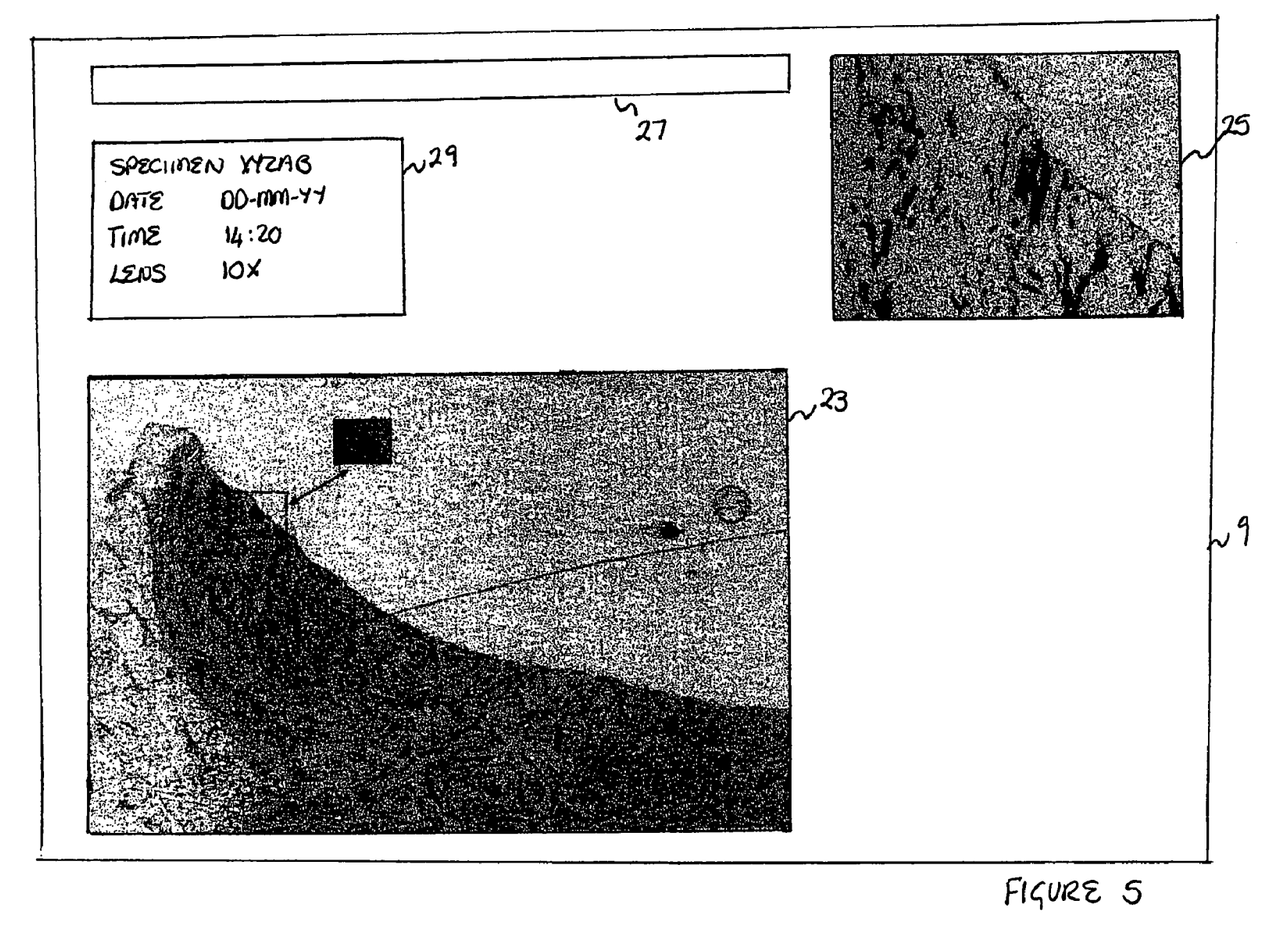
FIG. 5 is a screen shot illustrating the presentation, to a user, of the position of a high magnification image of a part of the specimen of FIG. 4 within the complete specimen, determined in accordance with the present invention.

At step 40 the digital camera 5 takes an image of the microscope field of view and forwards to the workstation 7 the high magnification image data thus acquired, which is stored in memory and displayed on the display screen 9 as a field of view image 25, as shown in FIG. 5.

At step 50, the workstation 7 processes the high magnification data so as to reduce the resolution thereof. In particular, since the high magnification image data represents only a small area of the complete specimen, the resolution thereof is higher than the resolution of the part of the low magnification image data that represents an area of the specimen of the same size. Accordingly, the high resolution image data is processed by conventional image decimation, or similar techniques, to provide processed reduced resolution image data representing the field of view image. In the embodiment, the reduction in resolution is such that the processed image data has a similar resolution to that of a corresponding portion of the low magnification image data of the complete specimen. The correct reduction in resolution is achieved by pre-calibrating the system, as discussed below.

At step 60, the workstation 7 compares the data for the reduced resolution image of the current field of view with the low magnification image data for the complete specimen to determine if a "possible match" can be found. The comparison may be carried out, for example, using cross correlation techniques, as well known to a person skilled in the art. In the preferred embodiment, the workstation has a predetermined threshold, for each microscope objective lens, that defines the percentage of identical data in the low magnification and high magnification image data necessary in order to for there to be a "possible match". Each time a possible match is found in the low magnification data, the position thereof is recorded.

Following comparison of the reduced resolution field of view image data with the low magnification image data of the complete specimen, if a single possible match is found, then the location of the area of the specimen in the field of view is determined to correspond to that of the matched area of the image of the complete specimen. In this case, at step 70, the display screen 9 highlights the area of the low magnification image displayed that matched with the field of view data, as shown by a box in FIG. 4.

If more than one possible match is found, the best or closest match may be highlighted on the display (i.e. the part of the low magnification image having the highest percentage of identical data to the high magnification field of view image data). If no match is found (i.e. no part of the low magnification image data has a percentage of identical data exceeding the threshold), at step 80, the display screen 9 indicates this on or adjacent to the displayed image of the specimen (e.g. by the words "Position Unknown").

In a preferred embodiment, at least a part of the method of the present invention, as illustrated in FIG. 2, is implemented in the form of a software application which may be provided in the form of a computer program on a computer readable medium. Such a computer readable medium may be a disk or other data storage device, which can be loaded in a disk drive of the workstation 7 of the system of FIG. 1. Alternatively, if the workstation 7 is connected to a network, the program may be held in a server carrying a website, which permits downloading of the program over the Internet by the workstation. One or more processor readable storage devices having processor readable code embodied on said processor readable storage devices may be provided, the processor readable code may be provided for programming one or more processors to perform the methodology disclosed herein. Thus, the present invention may be embodied in the form of a carrier wave with the computer program carried thereon.

Figure 3:
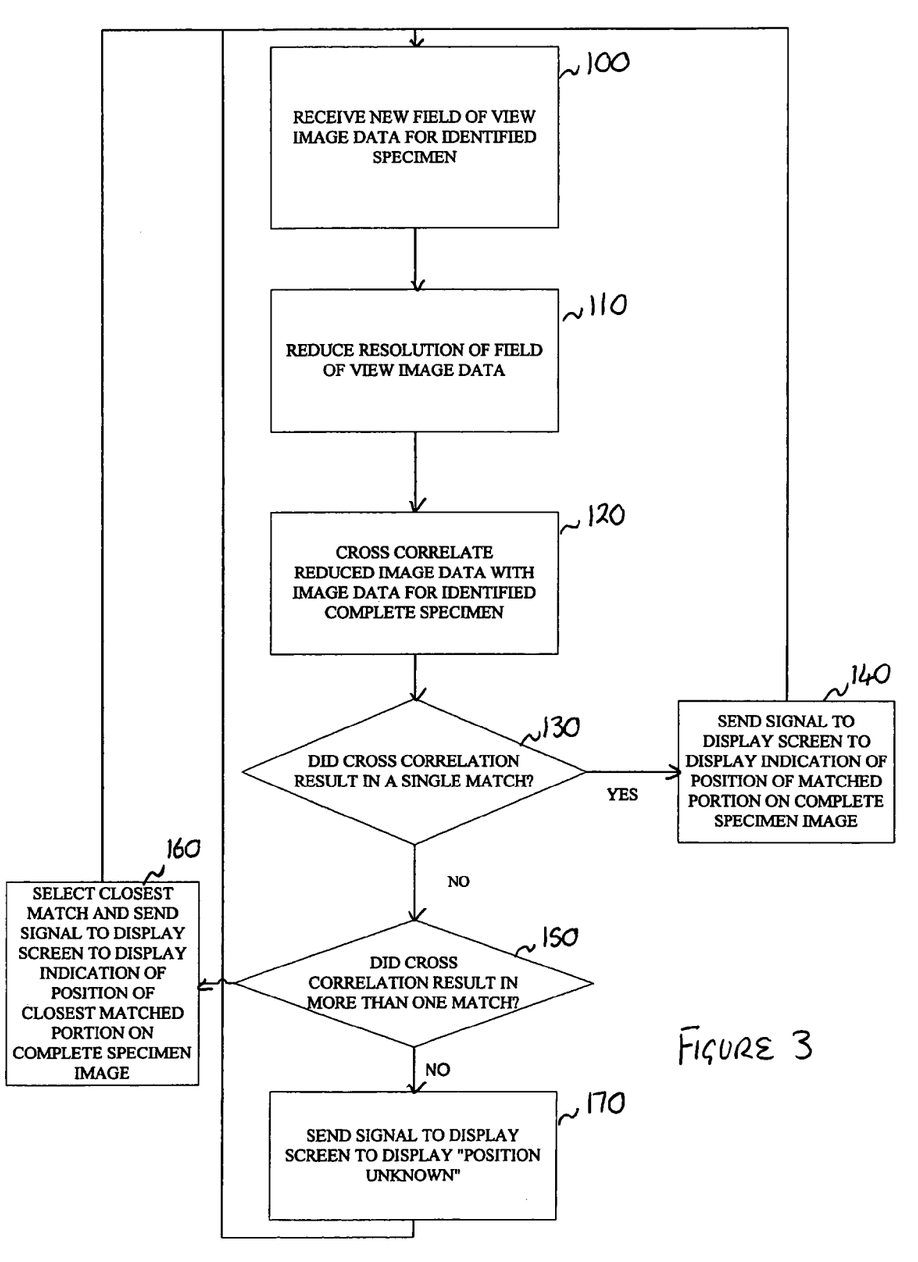
FIG. 3 is a flow diagram illustrating the program steps carried out by a preferred computer program used to implement the method of the preferred embodiment of the present invention.

FIG. 3 illustrates the program steps carried out by a computer program in accordance with a preferred embodiment of the present invention. The computer program is loaded in workstation 7, which receives image data from digital camera 5 and flatbed scanner 19 as discussed above.

It is assumed that prior to the start of the program illustrated in FIG. 3, the user initiates the system, and, if necessary, performs calibration of the system (this is usually only required when the program is used with a system for the first time, or new equipment is installed in the system).

Conventional calibration of each objective lens of the microscope in conjunction with the camera, and calibration of the scanner is necessary, and the skilled person would be familiar with the necessary techniques involved, and a detailed discussion thereof is unnecessary. Briefly, a calibrated graticule is used with the microscope and camera to measure the number of pixels per unit length represented in the high magnification image data, and thus the resolution thereof. Similarly, a calibrated graticule is used with the scanner to measure the number of pixels per unit length represented in the low magnification image data, and thus the resolution thereof. From this calibration information, the program calculates the relative resolutions of the image data for the microscope and the camera.

The program is initiated by a user, and low magnification image data from the flatbed scanner 19 or other image data source is received and stored in the workstation memory and displayed on display screen 9 using conventional software (step 10 of the method of FIG. 2) prior to the program steps illustrated in FIG. 3. It will be appreciated that in other embodiments, the computer program may include the necessary program steps to perform the scanning step.

In accordance with a preferred embodiment, the camera is set up to capture field of view images at its highest speed (e.g. 30 frames per second) and the program runs continuously, following initiation by the user for a particular specimen. Thus, the workstation continuously receives field of view images.

At step 100, the program receives field of view image data from the digital camera 5. Any field of view image data received from camera 5 during subsequent processing steps 110 to 170 are not processed and may be overwritten in workstation memory. The field of view image data currently being processed is retained in memory (and displayed on the display screen 9) until the program returns to step 100, as described below.

At step 110, the program reduces the resolution of the field of view image data to a resolution approximating that of a corresponding area of the image data of the complete specimen received from the scanner 19 and stored in memory, to obtain reduced resolution field of view image data. The reduction in resolution is determined based on the calibration data for the scanner and the objective lens of the microscope and camera from which the image data is acquired, as discussed above.

At step 120, the program performs cross correlation of the reduced resolution field of view image data obtained at step 110 with the low magnification image data of the complete specimen stored in memory, and stores the location of portions of the low magnification image data for each possible match. As explained above, it will be appreciated that a possible match is determined based on the quantity of identical data in both sets of image data, a possible match being identified if the proportion of identical data exceeds a preset threshold for each objective lens of the microscope. For example, a percentage of identical data that may be considered to be a threshold for a potential match may be 25%. In practice, a match is likely to exist if the percentage of identical data is in the range of 50% to 90% (it should be appreciated that a 100% match is statistically improbable). In the preferred embodiment, the user is able to adjust this threshold based on the results, and thus interactively adjust the system to provide the most accurate position determination. Thus, if the threshold is set too high, the system will not be able to locate the position in most cases, and the user is able to reduce the threshold in order to achieve better position determination.

At step 130, the program considers if the cross correlation resulted in at least one possible match between the reduced resolution field of view data and the low magnification data for the complete specimen.

If step 130 determines that the cross correlation resulted in a single possible match of the field of view image data in the overall specimen image data, the program continues with step 140, and sends a signal to the display screen to display an indication of the location of the matched portion of the image of the complete specimen (e.g. by highlighting in colour, or, as shown in FIG. 5, surrounding by a box, the area of the complete specimen image on the display corresponding to the matched image data).

Alternatively, if step 130 determines that the cross correlation did not result in a single match of the image data, the program continues with step 150, by considering whether more than one possible match of the image data was found by the cross correlation at step 120.

If step 150 determines that the cross correlation performed at step 120 did not result in more than one possible match, then no possible match has been found, and at step 170, the program sends a signal to the display screen 9 to display that the location of the field of view cannot be determined, in the present example, by displaying the words "Position Unknown".

Alternatively, if step 150 determines that the cross correlation performed at step 120 did result in more than one match (which is unlikely for most biological specimens, but may occur for other types of objects), in accordance with the preferred embodiment, at step 160, the program selects the closest matched area of the low magnification image (i.e. the matched area of the low magnification image data with the highest percentage of identical data to the reduced resolution field of view data), and sends a signal to the display screen 9 to highlight this closest matched area in the complete specimen image. In this case, the manner of highlighting is preferably different from the highlighting used in response to step 140 where a single possible match is found.

In another embodiment, step 160 may instead send a signal to the display screen 9 to highlight all the matched portions of the image of the complete specimen. In this case, again, an alternative form of highlighting is desirable to distinguish from the definite match at step 140.

After the program has sent a signal to the display screen 9, at step 140, 160 or 170, the program returns to step 100 and commences processing the next field of view image to be received from the camera 5 which is then immediately displayed on the display screen 9 and stored in memory.

In view of the likelihood of only a single match occurring for certain types of object, in another embodiment, steps 150 and 160 may be omitted. Thus, in this embodiment, if step 130 determines that the cross correlation did result in a (single) match, the program proceeds to step 140, and if step 130 determines that the cross correlation did not result in a (single) match, the program proceeds straight to step 170.

As mentioned above, FIG. 4 illustrates, by way of example, the image of a specimen on slide 21 acquired by the low magnification scan in accordance with the present invention. This low magnification image, or a part thereof, is displayed on display screen 9, as shown in FIG. 5 and described below, when the program of FIG. 3 is used in conjunction with the system shown in FIG. 1.

As shown in FIG. 5, in another embodiment, the display screen 9 includes two separate display areas; a main area displays the current, magnified, high resolution field of view image of the microscope 1, labelled 25 in FIG. 5, and a secondary area displays the low magnification image of the complete specimen (or a proportion thereof), labelled 23 in FIG. 5. The display may also include a toolbar 17 and an information area 29 providing identifying information about the current specimen and/or system equipment.

In the preferred embodiment, and as shown in FIG. 5, when the program is in use, the displayed low magnification image 23 does not show the complete specimen (as shown in FIG. 4) but rather shows a significant proportion of the area of the specimen surrounding the identified position of the current field of view image 25. It will be appreciated that initially, or when using a lower magnification objective lens (in the illustrated example, a 10× objective lens is used to obtain the field of view image), the complete specimen may be shown in the secondary area of the display, and used as the navigation map.

As shown in FIG. 5, an area is highlighted by dashed outline in the low magnification image of the specimen 23, which area corresponds to, and represents the position within the complete specimen of, the high magnification field of view image 25. The highlighted area changes each time the position of the stage 3 of the microscope 1, and thus the specimen, is moved. In this way, displayed image 23 provides a navigation map of the specimen which enables the user to easily locate the current position of the field of view image, and to determine the relative positions of other features of interest in the specimen.

Whilst one embodiment of the present invention has been described for use with an optical microscope, it will be appreciated that the present invention may be used with other types of microscope.

Various modifications and changes may be made to the described embodiments. It is intended to include all such variations, modifications and equivalents that fall within the spirit and scope of the present invention.

The invention claimed is:

1. A method for determining a position of an area of an object within said object, wherein an image of said area of said object is contained within a field of view of a microscope, and wherein image data representing a low magnification image of the complete object is available, the method comprising the steps of:

acquiring high magnification image data representing an image of the field of view of the microscope;

using one or more processors to perform the steps of:

processing the high magnification image data to reduce the resolution thereof;

comparing the processed high magnification image data with portions of the low magnification image data; and, determining said position based on the results of said comparison.

2. A method as claimed in claim 1, in which the comparison determines a percentage of identical data in each compared portion of the low magnification image data and the processed high magnification image data.

3. A method as claimed in claim 1, in which a position is determined if the determined percentage of identical data for at least one portion of the low magnification image data exceeds a predetermined threshold.

4. A method as claimed in claim 3, in which the step of determining said position based on the results of said comparison comprises determining the position as the position of the, or one of the, at least one portion of the low magnification image data.

5. A method as claimed in claim 4, in which, if the percentage of identical data for more than one portion of the low magnification image data exceeds the predetermined threshold, the position is determined as the position of the portion with the highest percentage of identical data.

6. A method as claimed in claim 1, in which the processing comprises reducing the resolution by a predetermined amount.

7. A method as claimed in claim 6, in which the predetermined amount is a factor determined by calibration of an apparatus from which the low magnification image data is acquired, and calibration of the microscope.

8. A method as claimed in claim 1, further comprising displaying an image of the complete object and of the field of view of the microscope on a display screen, and highlighting the area of the image of the complete object corresponding to the determined position.

9. A method as claimed in claim 1, further comprising, initially acquiring said low magnification image data from a high resolution image data source.

10. A method as claimed in claim 9, wherein the image data source is one of a scanner, digital photocopier and a high resolution digital camera.

11. One or more tangible processor readable storage devices that can be loaded in a drive of a workstation, the one or more tangible processor readable storage devices having processor readable code embodied on said tangible processor readable storage devices, said processor readable code for programming one or more processors to perform a method for determining a position of an area of an object within said object, wherein an image of said area of said object is contained within a field of view of a microscope, and wherein image data representing a low magnification image of the complete object is available, the method comprising the steps of:

acquiring high magnification image data representing an image of the field of view of the microscope;

processing the high magnification image data to reduce the resolution thereof;

comparing the processed high magnification image data with portions of the low magnification image data; and, determining said position based on the results of said comparison.

12. A tangible computer program product comprising:

a tangible computer readable medium that can be loaded in a drive of a workstation, the tangible computer readable medium having a computer readable program code means embodied in said medium for determining a position of an area of an object within said object, wherein an image of said area of said object is contained within a field of view of a microscope, and wherein image data representing a low magnification image of the complete object is available; the computer readable program code means in said computer program product comprising:

computer readable program code means for causing the computer to acquire high magnification image data representing an image of the field of view of the microscope;

computer readable program code means for causing the computer to process the high magnification image data to reduce the resolution thereof;

computer readable program code means for causing the computer to compare the processed high magnification image data with portions of the low magnification image data, and, computer readable program code means for causing the computer to determine said position based on the results of said comparison.

* * * * *